United States Patent [19]
Tanaka et al.

[11] Patent Number: 4,726,646
[45] Date of Patent: Feb. 23, 1988

[54] OPTICAL SWITCH

[75] Inventors: Yoshiyasu Tanaka; Sadakazu Ariga, both of Yokohama; Mituyosi Suzuki, Machida; Ayako Sakamoto, Yamato, all of Japan

[73] Assignee: E. I. Du Pont de Nemours and Company, Wilmington, Del.

[21] Appl. No.: 703,515

[22] Filed: Feb. 20, 1985

[51] Int. Cl.⁴ .......................... G02B 6/36; G02B 6/38
[52] U.S. Cl. .................................. 350/96.20; 350/96.21
[58] Field of Search ............... 350/96.15, 96.20, 96.21, 350/96.22

[56] References Cited
U.S. PATENT DOCUMENTS
4,376,566 3/1983 Blackington ..................... 350/96.2

Primary Examiner—Eugene R. LaRoche
Assistant Examiner—Steven J. Mottola

[57] ABSTRACT

An optical switch for opening and shutting a light path comprising a housing, a shutter movably supported in the housing for shutting off and transmitting incident light, and a drive mechanism supported in the housing for displacing the shutter. The optical switch has two connector sockets provided in the housing, and a first and a second optical fiber. One end of the first optical fiber faces one end of the second optical fiber with a predetermined distance between them and the other ends of these optical fibers are fitted respectively in the connector sockets. The shutter is disposed between the facing ends of the optical fibers. In another aspect, the housing includes at least one pair of fiber holding sections for holding the end portions of at least one pair of optical fibers so that they face each other with a predetermined distance between them, and the shutter is movably supported between the fiber holding sections in each pair of the fiber holding sections.

8 Claims, 24 Drawing Figures

OPTICAL SWITCH

BACKGROUND OF THE INVENTION

1. Field of the Invention

This invention relates to an optical switch for opening and shutting a light path formed of an optical fiber.

2. Description of the Prior Art

The switch is a basic device in an electric circuit for performing conduction and breaking of an electric current, an electrical signal, etc. or for forming electrical signals. Likewise, a light transmitting circuit composed of optical fiber requires an optical switch as an element for transmitting and shutting off a beam of light conveying energy, signals, etc., or for forming optical signals.

Various on-off optical switches of this type have been devised previously. They include, for example, one in which an optical fiber constituting a light path is cut and at the facing cut sections, one of the optical fiber portions is adapted to move relatively in a direction at right angles to the optical axis, and one in which an optical fiber constituting a light path is cut, and a shutter is interposed between the facing cut sections.

These devices, however, are provided individually in light paths and do not constitute a single integrated unit. They have no versatility as in the electrical switch. Furthermore, since they are provided individually, the connection of optical fibers to the optical switches is comparatively troublesome.

SUMMARY OF THE INVENTION

It is an object of this invention to provide an optical switch which constitutes a single integrated device and has versatility.

Another object of this invention is to provide an optical switch which permits easy connection and disconnection of optical fibers.

Still another object of this invention is to provide an optical switch which is particularly suitable for use in an optical keyboard.

The above and other objects of this invention are achieved in accordance with this invention by an optical switch for opening and shutting a light path comprising a housing, a shutter movably supported in the housing for shutting off and transmitting incident light, and a drive mechanism supported in the housing for displacing the shutter, said optical switch having two connector sockets provided in the housing and a first and a second optical fiber, one end of the first optical fiber facing one end of the second optical fiber with a predetermined distance therebetween and the other ends of the first and second optical fibers being fitted respectively in the connector sockets, and said shutter being disposed between the facing ends of the first and second optical fibers.

In another aspect, the above and other objects of this invention are also achieved in accordance with this invention by an optical switch for opening and shutting a light path comprising a housing, a shutter movably supported in the housing for shutting off and transmitting incident light, and a drive mechanism supported in the housing for displacing the shutter, said housing including at least one pair of fiber holding sections for holding the end portions of at least one pair of optical fibers so that they face each other with a predetermined distance therebetween, said shutter being movably supported between the fiber holding sections in each pair of the fiber holding sections.

The above-mentioned and other objects and features of this invention and the manner of attaining them will become more apparent and the invention itself will be best understood by reference to the following description of embodiments of the invention taken in conjunction with the accompanying drawings.

DETAILED DESCRIPTION OF THE INVENTION

With reference to FIGS. 1 to 4C, a first embodiment of the invention will be described.

Figure 1:
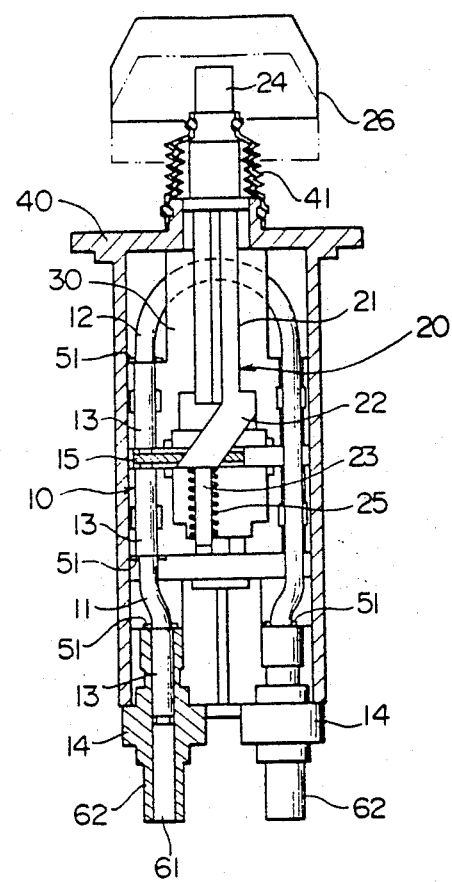
FIG. 1 is a sectional view of an optical switch in accordance with a first embodiment of the invention.

FIG. 1 is a sectional view of an optical switch in accordance with the first embodiment of the invention. The optical switch is comprised of an optical system 10 consisting of a first and a second optical fiber 11 and 12 and a shutter 15, a drive mechanism 20 for displacing the shutter 15, a supporting member 30 for supporting the optical system 10 and the drive mechanism 20 as an integral unit, and a case 40 accommodating the integral unit held by the supporting member 30.

The first and second optical fibers 11 and 12 are fitted at their both ends into sleeves 13, and one end of the first optical fiber is caused to face one end of the second optical fiber 12 with a space between them for the interposition of the shutter 15. The other ends of the two optical fibers 11 and 12 are respectively fitted into connector sockets 14. In this state, the optical fibers are mounted on the supporting member 30. In order to cause the two optical fibers 11 and 12 to face each other, the second optical fiber 12 which is longer is bent in a nearly J-shape. Accordingly, the optical fiber is made desirably of a material having flexural resistance such as a plastic material.

The sleeves 13 serve to secure the end portions of the optical fibers 11 and 12 to the supporting member 30 and the connector sockets 14 and are each composed of a metallic cylindrical member having an anchoring projection 51 at its base end. The optical fibers 11 and 12 are fitted into the sleeves 13 by press-bonding or otherwise. Alternatively, the sleeves 13 may be in the form of a plate adapted to be wound around the peripheries of the optical fibers. The optical fibers 11 and 12 may be directly fitted into the sleeves 13 or after their cladding layers have been removed.

Figure 2A:
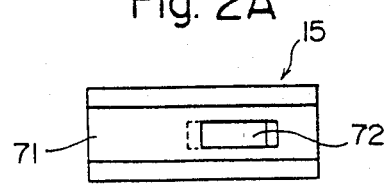
FIG. 2A is a top plan view of a shutter in the optical switch shown in FIG. 1.
Figure 2B:
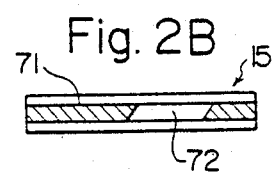
FIG. 2B is a vertical sectional view of the shutter shown in FIG. 2A.
Figure 2C:
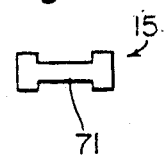
FIG. 2C is a side elevation of the shutter shown in FIG. 2A.

The shutter 15 is made of a plastic material, etc. in a one-piece unit having an H-shaped cross section as shown, for example, in FIGS. 2A to 2C. A light shutting portion 71 for shutting a light path is provided in one side portion of the shutter 15 in its longitudinal direction, and at a site nearer to the other end is formed an oblique engaging hole 72 adapted to engage a translation cam 22 of the drive mechanism 20. In the embodiment shown in the drawings, the shutter 15 has the light-shutting portion 71, but instead of it, a light-transmitting portion may be provided.

Figure 3:
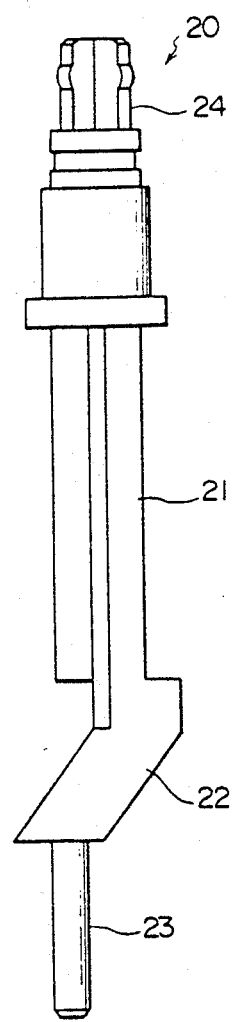
FIG. 3 is a front elevation of a drive shaft of the optical switch shown in FIG. 1.

The drive mechanism 20 is comprised of, for example as shown in FIG. 3, a drive shaft 21, the translation cam 22, a guide shaft 23 and a key top securing section 24 which are provided as a one-piece unit made of a plastic material, etc., a spring 25, and a key top 26. The drive mechanism 20 is connected to the shutter 15, and displaces it longitudinally.

The drive shaft 21 is formed, for example, in a cruciferous cross sectional shape. It is held by the supporting member 30 for free axial displacement, and displaces the translation cam 22 axially. The cam 22, formed nearly in the shape of a parallelogram, is inserted in, and engages, the engaging hole 72 of the shutter 15 and converts the axial displacement into a displacement in a direction perpendicular to it, thereby displacing the shutter 15. The guide shaft 23 guides the axial displacement of the translation cam 22 and supports the spring 25. The key top 26 is secured to the key top securing portion 24. The spring 25 is energized by the translation cam 22, and returns the displaced cam 22 and drive shaft 21 to their original positions.

Figure 4A:
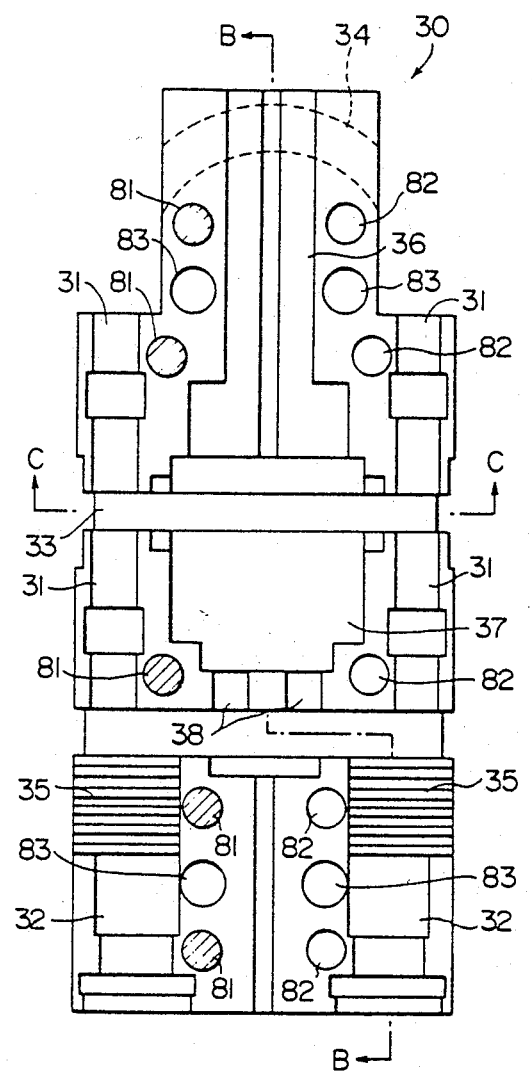
FIG. 4A is a front elevation of a supporting member used in the optical switch shown in FIG. 1.
Figure 4B:
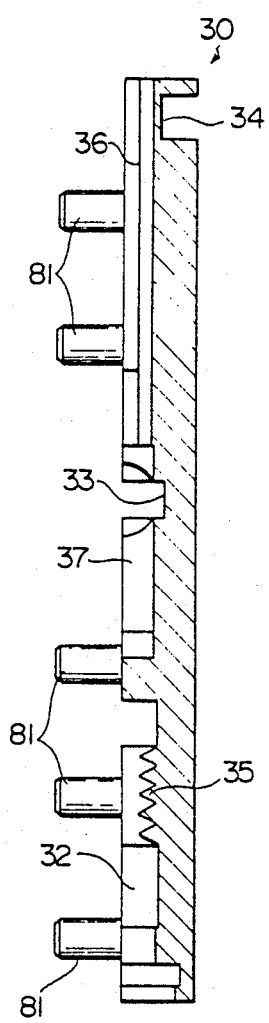
FIG. 4B is a sectional view taken along line B—B of FIG. 4A.
Figure 4C:
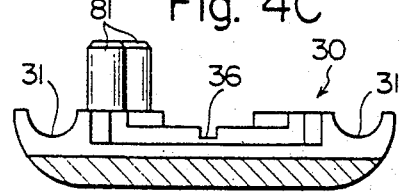
FIG. 4C is a sectional view taken along line C—C of FIG. 4A.

The supporting member 30 is formed of a plastic material, etc. as a receptacle for holding the optical system 10 and the drive mechanism 20. In this embodiment, it is constructed by integrating two pieces of the same shape and structure. One piece of the supporting member 30 is shown in FIGS. 4A to 4C. Combining of the pieces of the same shape and structure has the advantage that the production of the pieces themselves is easy and the optical system 10, etc. can be easily mounted on the supporting member 30.

The supporting member 30 has a shutter accommodating section 33 centrally in the transverse direction to hold the optical system 10A. A pair of sleeve securing portions 31 for fixing and holding the sleeve 13 into which the facing end portions of the optical fibers 11 and 12 are fitted is provided at each of the left and right end portions of the shutter accommodating section 33 so that the sleeve securing portions 31 in each pair have the shutter accommodating section 33 between them. Socket securing sections 32 for holding the base ends of the connector sockets 14 are provided at the left and right sides of the lower end portion of the supporting member 30. A fiber slippage preventing member 35 in a triangular wavy form, which is not essential, is further provided between each socket securing section 32 and each sleeve securing section 31 in the illustrated embodiment. A fiber receiving groove 34 for receiving the bent portion of the second optical fiber 12 is set up in the upper end portion of the supporting member 30.

For holding the drive mechanism 20, the supporting member 30 further includes near its central axis a drive shaft accommodating section 36 for holding the drive shaft 21 for free axial displacement, a cam accommodating section 37 for accommodating the translation cam 22 for free right or left displacement, and a guide shaft accommodating section 38 for slidably accommodating the guide shaft 23. The spring 25 is received in the cam accommodating section 37 while being supported by the guide shaft 23.

The supporting member 30 also includes fitting pins 81 (shown by hatchings in FIG. 4A) and fitting holes 82 formed at positions symmetrical to each other with respect to the central axis of the supporting member 30. Through-holes 83 are also provided for use in securing the two pieces by bolts, nuts, etc.

The optical system 10 and the drive mechanism 20 are mounted on the supporting member 30 as shown in FIG. 1 and accommodated in the case 40. Then, a bellows-like dust cover 41 and the key top 26 are secured to construct an optical switch.

In a normal condition where the key top 26 is not depressed (the condition shown in FIG. 1), the light shutting portion 71 of the shutter 15 exists between the facing end surfaces of the first and second optical fibers 11 and 12 to shutter the light path. When the key top 26 is depressed, the translation cam 22 is lowered by the drive shaft 21 and the shutter 15 engaging the cam 22 is displaced longitudinally. As a result, the light shutting portion 71 of the shutter 15 moves away from the space between the facing end surfaces of the optical fibers 11 and 12 to open the light path. Accordingly, when external optical fiber cables are connected to the connector sockets 14, the optical switch functions as an on-off switch for a light transmitting path composed of the above optical fiber cables.

The optical switch in the above embodiment may be caused to open the light path in a normal condition and shut it when the key top 26 is depressed, if the translation cam 22 is reversed in its horizontal position and the shutter 15 is turned upside down, and both are held by the supporting member 30.

A second embodiment of this invention will now be described with reference to FIGS. 5A to 6B.

Figure 5A:
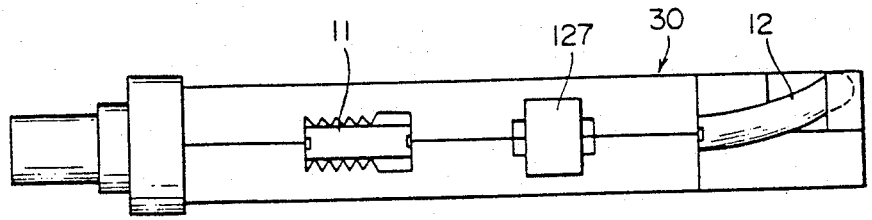
FIG. 5A is a top plan view of an optical switch in accordance with a second embodiment of the invention.
Figure 5B:
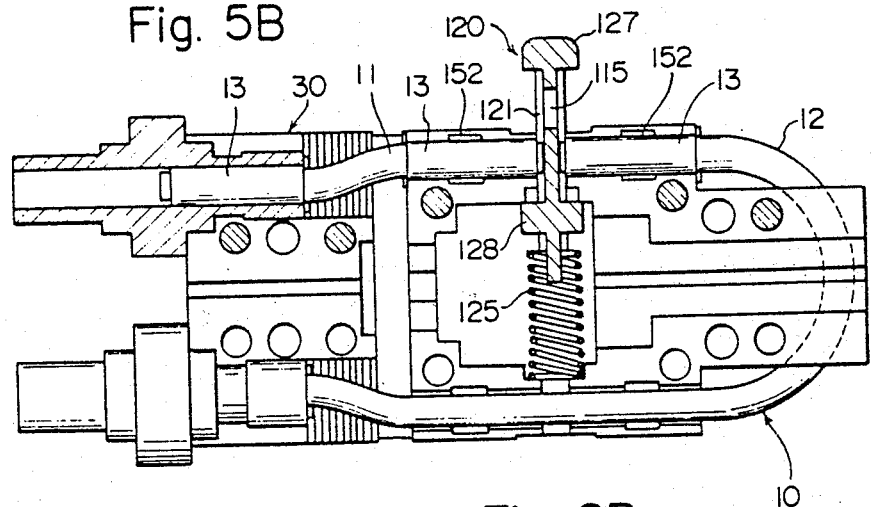
FIG. 5B is a front elevation of the optical switch shown in FIG. 5A as it is cut into two pieces.

FIG. 5A is a top plan view of an optical switch in accordance with the second embodiment of the invention, and FIG. 5B is a front elevation of the optical switch shown in FIG. 5A as it is divided in two. The optical switch shown in these drawings is constructed by accommodating the optical system 10 and a drive system 120 in the same supporting member 30 as used in the first embodiment, and is basically of the same structure as the optical switch of the first embodiment except that the structures of the shutter 115 and the drive system 120 are different and these members are not encased.

Figures 6A, 6B:
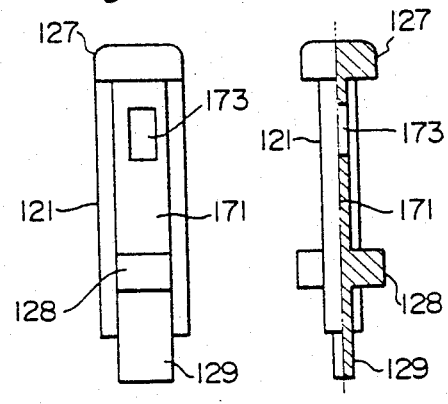
FIG. 6A is a side elevation of a one-piece unit of a shutter and a drive shaft in the optical switch shown in FIG. 5A.
FIG. 6B is a partial sectional front elevation of the one-piece unit of the shutter and drive shaft shown in FIG. 6A.

As shown in FIGS. 6A and 6B, the shutter 115 and the drive mechanism 120 of the optical switch in accordance with the second embodiment of this invention are formed as a one-piece unit from a plastic material, etc., and unlike the first embodiment, the drive mechanism 120 has no translation cam. The shutter 115 is provided in a drive shaft 121 and consists of a window-like light transmitting portion 173 and a light shutting portion 171. It is adapted to be displaced axially together with the drive shaft 121. A push button 127 for depressing the shaft 121 is provided at the upper end of the drive shaft 121, and near the lower end of the shaft 121, an engaging projection 128 is provided. A guide shaft 129 is provided so as to project from the lower end of the drive shaft 121.

The shutter 115 and the drive shaft 121 are mounted and held on the supporting member 30 so as to come between the facing end surfaces of the optical fibers 11 and 12. A spring 125 is secured to the lower end of the drive shaft 121. By attaching the other mating piece to the supporting member 30 face to face, the optical switch shown in FIG. 5A is obtained. The optical switch in the second embodiment is normally closed, but by changing the structure of the shutter, it can be easily rendered normally open.

As shown in FIG. 5B, a lance 152 is provided in the sleeve 13 holding the facing ends of the first and second optical fibers therein. The lance 152 is formed by raising part of the peripheral wall of the sleeve 13 by cutting and serves to prevent the sleeve 13 from slipping out. But it is not an essential component.

The optical switches in the above embodiments can be directly used as an on-off type optical switch. By attaching an actuator to them for pressing the drive shaft, they can also be used as a microswitch or limit switch.

Now, a third embodiment of the invention will be described with reference to FIGS. 7A to 14.

Figure 7A:
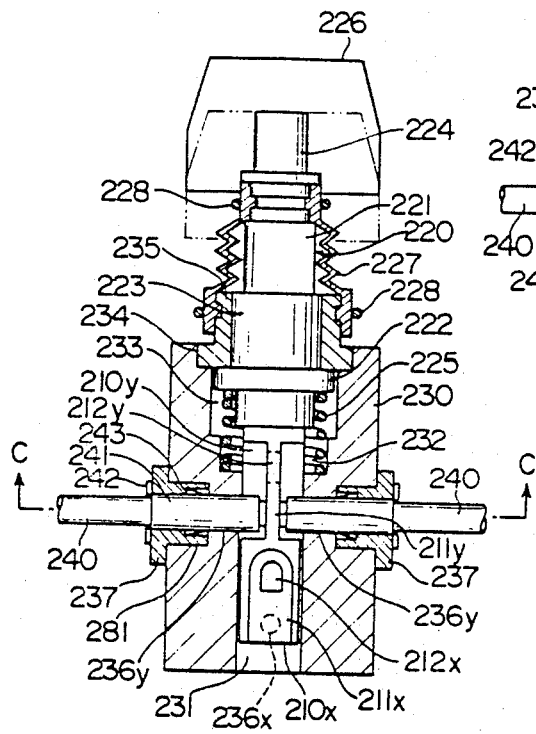
FIG. 7A is a partial sectional view of an optical switch in accordance with a third embodiment of the invention.
Figure 7C:
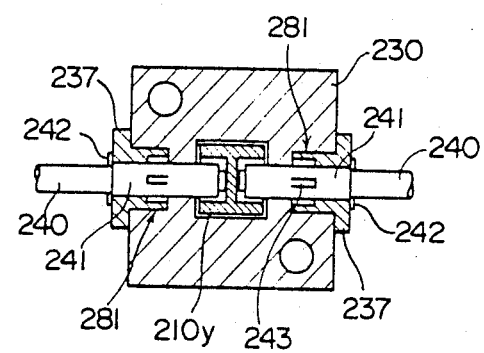
FIG. 7C is a sectional view taken along line C—C of FIG. 7A.
Figure 7B:
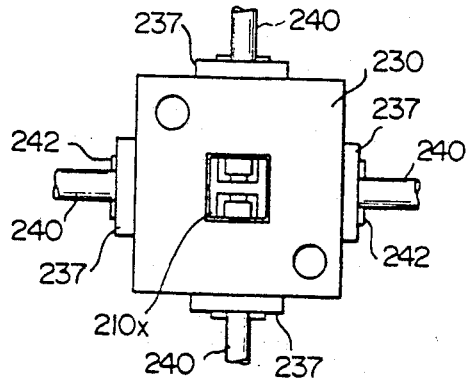
FIG. 7B is a bottom view of the optical switch shown in FIG. 7A.

FIG. 7A is a partial sectional view of an optical switch in accordance with the third embodiment of the invention; FIG. 7B, a bottom view thereof; and FIG. 7C, a sectional view taken along line C—C. The switch in accordance with the third embodiment is a two light path switch having a light path formed both in the X direction (perpendicular to the sheet surface in FIG. 7A) and the Y direction (horizontal of the sheet surface in FIG. 7A). It is comprised of shutters 210x and 210y for shutting or opening the light paths, a drive mechanism 220 for displacing the shutters 210x and 210y, and a housing 230 for holding the shutters and the drive mechanism and securing the end portions of optical fibers 240.

Figure 8A:
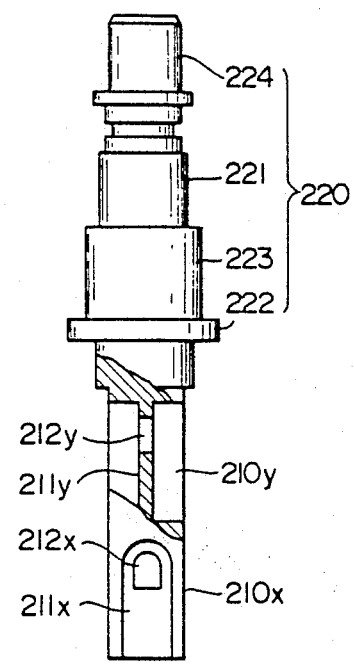
FIG. 8A is a partial sectional front elevation of the shutter and drive shaft of the optical switch shown in FIG. 7A.
Figure 8B:
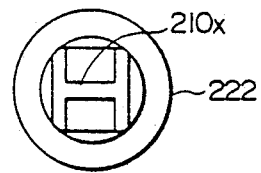
FIG. 8B is a bottom view of the shutter and drive shaft shown in FIG. 8A.

The shutters 210x and 210y are formed in an H cross sectional shape, etc. as shown in FIG. 8B, from a plastic material, etc. as a unit, and oriented in directions 90° different from each other. As shown in FIG. 8A, in the present embodiment, the shutter 210y in the y direction is positioned in the upper portion of the drawing, and the shutter 210x in the X direction, in the lower portion of the drawing. The shutters 210x and 210y respectively are made of an H-shaped web having formed therein light shutting portions 211x and 211y and window-like light transmitting portions 212x and 212y. By providing the light shutting portions 211x and 211y below the light transmitting portions, there can be constructed a normally closed optical switch in which the light paths are shut when the shutters 210x and 210y are not displaced at all. The H-shape of the cross section of the shutters 210x and 210y contributes to an increase in strength, and they may have another cross sectional shape.

The drive mechanism 220 is comprised of a drive shaft 221 formed integrally with the shutters 210x and 210y, and a spring 225, a key top 226 and a dust cover 227 attached to the drive shaft 221. As shown in FIG. 8A, the drive shaft 221 has the shutters 210x and 210-y attached integrally to its lower end. A flange 222 in press contact with the spring 225 and a sliding portion 223 adapted to slide axially by being guided by a guide boss 235 are provided at the lower end portions of the drive shaft 221. A key top securing portion 224 is provided at the upper end of the drive shaft 221. The spring 225 is held by a spring holding section 232 of a housing 230 to be described. When pressed by the flange 111, the spring 225 is energized to return the drive shaft 221 to its original position. The key top 226 is secured to the top portion of the drive shaft 221 so as to be able to press the shaft 221 easily. The dust cover 227 is formed in the shape of bellows from a plastic material, rubber, etc., and attached below the key top 226 to the drive shaft 221 and the periphery of a guide boss 235 to be described. The displacement stroke of the drive mechanism 220 is determined by the pitches of the light shutting portions 211x and 211y and the light transmitting portions 212x and 212y of the shutters 210x and 210y.

The drive mechanism 220 and the shutters 210x and 210y need not to be formed as an integral unit. It is only necessary that the shutters 210x and 210y be displaced in relation to the movement of the drive mechanism 220 by pressing.

Figure 9A:
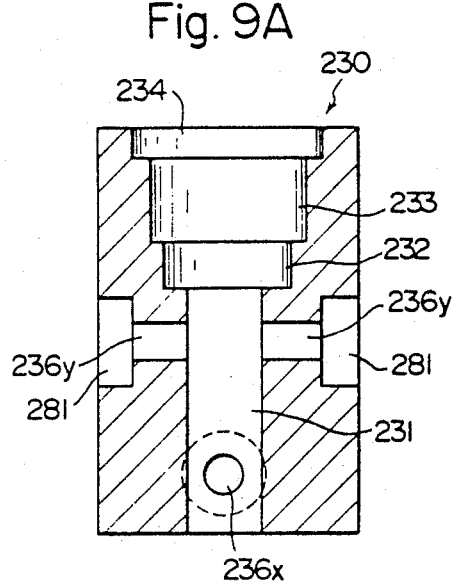
FIG. 9A is a vertical sectional view of a housing of the optical switch shown in FIG. 7A.
Figure 9B:
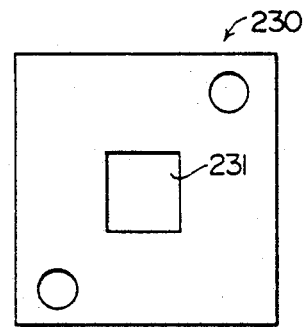
FIG. 9B is a bottom view of the housing shown in FIG. 9A.

The housing 230 is formed in a prismatic shape from a plastic material, for example, as shown in FIGS. 9A and 9B. The housing 230 includes in its central portion in the axial direction a shutter accommodating section 31 composed of a hole in a square sectional shape for accommodating the shutters 210x and 210y for free displacement, a spring holding section 232 for holding the lower end of the spring 225, a flange accommodating section 233 for slidably accommodating the flange 222, a guide boss mounting section 234 for mounting the guide boss 235, and fiber securing sections 236x and 236y provided at the X and Y direction side surfaces of the housing 230 for securing the end portions of optical fibers 240 to be connected to the optical switch.

Figure 10:
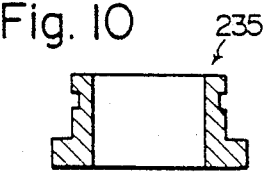
FIG. 10 is a sectional view of a guide boss used for mounting the drive shaft in FIG. 7A on the housing.

The guide boss 235 is composed of a cylindrical member having a partly protruded sectional shape as shown in FIG. 10. It is mounted on the guide boss mounting section 234 of the housing 230 to guide the sliding portion 223 of the drive shaft 221 slidably in the axial direction and to prevent the slipping out of the drive shaft 221.

The fiber mounting sections 236x and 236y are provided so as to cross the shutter accommodating section 231. The inside of each of the fiber securing sections is formed in a diameter which permits receiving of the sleeve 241 (FIG. 7C) having the end portion of the optical fiber fitted therein, and its outside is formed in a diameter which permits receiving of the boss 237 engaging the sleeve 241 as the boss mounting section 281. The fiber securing sections 236x are provided opposite to each other with the light shutting portion 211x of the shutter 210x interposed between them, and the fiber securing sections 236y are provided opposite to each other with the light-shutting portion 211y interposed between them.

Figure 11:
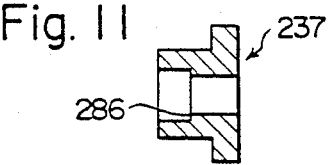
FIG. 11 is a sectional view of a boss used for mounting an optical fiber on the housing in FIG. 7A.

As shown in FIG. 11, the boss 237 is formed of a cylindrical member having a partly protruded sectional shape, and a stepped portion 286 is provided inwardly of its forward end. As shown in FIG. 7A, the stepped portion 286 receives and holds an engaging projection such as the lance 243 of the sleeve 241 having the end portion of the optical fiber fitted thereinto, and prevents the sleeve 241 from slipping out. Hence, when the sleeve does not have such an engaging projection, the stepped portion 286 is not necessary. The engaging projection 242 of the sleeve 241 engages the base end of the boss 237 to hamper the movement of the sleeve 241 in the direction of its forward end. The provision of various types of the boss 237 can permit engagement of sleeves in various shapes.

The procedure of assembly the optical switch in the third embodiment of the invention will be described.

First, the spring 225 is inserted into the spring holding section 232 of the housing 230, and then the shutter 210x and 210y and that portion of the drive shaft 221 which carries the shutters 210x and 210y are inserted into the spring 225, and accommodated in the shutter accommodating section 231. Then, the guide boss 235 is passed over the upper end of the drive shaft 221 and mounted on the guide boss mounting section 234. The dust cover 227 is secured to the guide boss 235 and the drive shaft 221 by means of a clamping ring 228. Finally, the key top 226 is secured to the key top securing portion 224 to form the optical switch in accordance with the third embodiment.

The assembling procedure, however, is not limited to the above-described one. For example, the guide boss 235, the dust cover 227 and the key top 226 may be secured in advance to the drive shaft 221, and thereafter, the shutter 210x and 210y may be accommodated in the shutter accommodating section 231. As desired, the dust cover 227 may be omitted.

The resulting optical switch may be caused to function as a switch by fitting the end portions of optical fibers to be connected to the optical switch into the sleeves 241, securing bosses 237 to to the boss mounting section 281 of the fiber securing sections 236x and 236y, securing the sleeves 241 to the fiber mounting sections 236x and 236y and causing the end surfaces of the optical fibers 240 to face each other in each of the fiber securing sections 236x and 236y. In this state, the light shutting portion 211x or 211y of the shutters 210x and 210y is interposed between the facing end surfaces of the optical fibers 240 and the light paths are shut. By depressing the key top 226, the shutters 210x and 210y are displaced downwardly via the drive shaft 221, and the light transmitting portion 212x or 212y is interposed between the end surfaces of the optical fibers. As a result, the light paths are opened. Thus, there is realized an on-off optical switch for two light paths in the same phase.

If it is desired to use this switch as a one light path optical switch, only the shutter in either of the X and Y directions is used. Furthermore, the two light paths may be maintained in different phases by reversing the arrangement of the light shutting portion 211x and the light transmitting portion 212x of one of the shutters, for example 210x. By so doing, one light path, for example, can be maintained shut while the other is opened.

In the third embodiment described above, the optical switch is of the transmission type. If desired, it may be formed in a reflection type. One example of the shutter used in this case is shown in FIG. 12.

Figure 12:
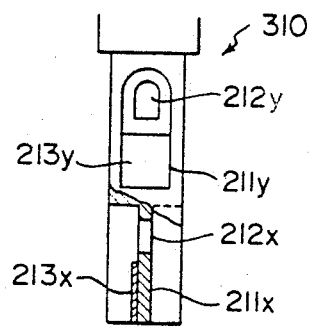
FIG. 12 is a partial sectional front elevation of a reflection-type switch that can be used in the optical switch shown in FIG. 7A.

A shutter 310 shown in FIG. 12 is obtained by forming reflecting portions 213x and 213y on the surfaces of the light shutting portions 211x and 211y of the shutters used in the above embodiment. The reflecting portions may be obtained by coating a reflecting film of aluminum, chromium, or the like. The light transmitting portions 212x and 212y and the reflecting portions 213x and 213y can constitute a normally reflective optical switch. It can be constructed in a normally transmitting type if the positions of the light transmitting portions 212x and 212y and the reflecting portions 213x and 213y are reversed vertically.

The switch of the third embodiment is a two light path switch having light paths in the X and Y directions. It may be constructed, however, as a switch having only one light path, or three or more light paths. If desired, the switch light paths may be provided all in the same direction, or radially.

The optical switch in accordance with the third embodiment of the invention constitutes a single optical switch by itself, and may also be used as a switch element of an optical keyboard. For example, an optical keyboard may be constructed by arranging a plurality of normally transmitting-type two light path optical switches in a matrix form so that the optical paths in one direction of these switches are aligned vertically and the optical paths in the other direction of these switches are aligned horizontally, optically connecting the light paths to each other in each of the vertical and horizontal rows, providing means for supplying bias light at one end of each horizontal or vertical row, and connecting an optical fiber for outputting to each of the horizontal or vertical rows.

Figure 13:
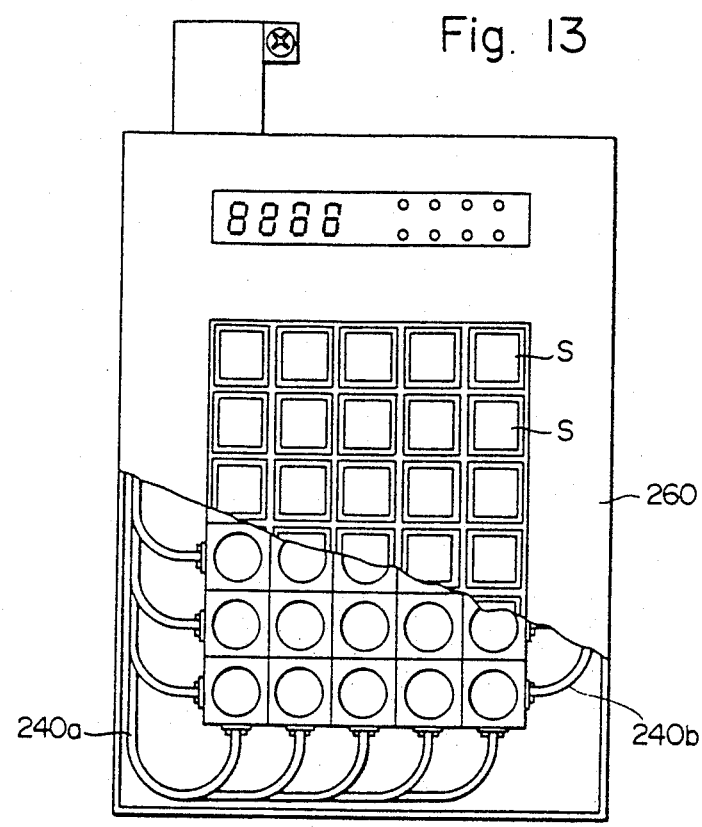
FIG. 13 is a sectional view, partly cut away, of a keyboard incorporating the optical switch shown in FIG. 7A.
Figure 14:
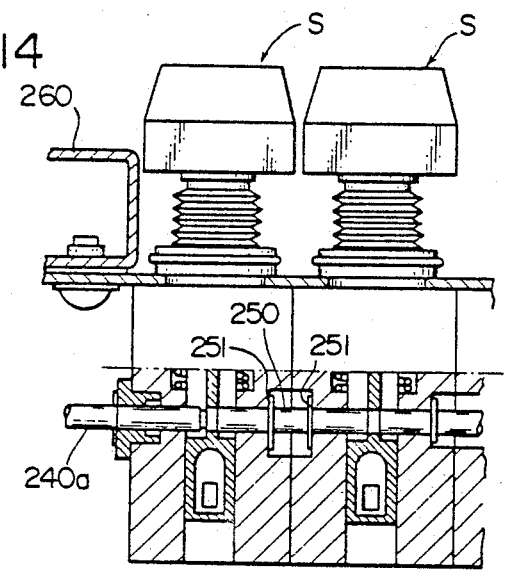
FIG. 14 is a sectional view showing the connection of optical switches.

One example of the optical keyboard is shown in FIG. 13. The optical keyboard shown in FIG. 13 comprises normally transmitting-type two light path optical switches S arranged in a matrix of five in horizontal rows and six in vertical rows. Optical fibers 240a from light sources are connected as bias light feed means to those optical switches S which exist at the ends of these vertical and horizontal rows on one side, and optical fibers 240b for outputting are connected to the corresponding opposite ends of these rows. The two adjacent switches S are connected to each other by a connector means composed of a sleeve 250 having two anchoring flanges 251 formed at the middle portion of the connector means and a short optical fiber fitted in the sleeve.

As stated hereinabove, by accommodating and holding the shutter for shutting off, transmitting or reflecting incident light and the drive mechanism for displacing the shutter in the housing, there can be obtained an inegrated device consisting of elements required of the switch. This device can be connected to optical fibers by means of connectors, and thus can attain versatility as in the case of the electrical switch.

What is claimed is:

1. An optical switch for opening and shutting a light path between at least two optical fibers comprising:
   a housing provided with at least two connector sockets;
   a first and a second optical fiber fitted respectively in each of said connector sockets, one end of each optical fiber being disposed within said housing and facing each other separated by a predetermined distance, the other end of each optical fiber being disposed outside the housing via the connector sockets;
   a shutter movably supported within said housing between said facing ends of the optical fibers; and
   a drive mechanism supported within the housing for displacing said shutter, said drive mechanism including a translation cam means having a parallelogram shape and a drive shaft connected to said cam means, whereby said translation cam means engages said shutter and converts displacement of said drive shaft into a displacement of said shutter in a direction approximately perpendicular to the displacement of said drive shaft thereby displacing the shutter between said facing ends of the fibers to either block or transmit light between said fibers.

2. The optical switch of claim 1 wherein the two connector sockets are arranged parallel to each other horizontally.

3. The optical switch of claim 1 wherein said shutter has a H-shaped cross-section.

4. An optical keyboard comprising a plurality of optical switches for opening and shutting light paths between two pairs of optical fibers, each optical switch comprising:
   a housing provided with a first and second pair of fiber securing sections;
   a first and a second pair of optical fibers, one end of each optical fiber of said first pair of optical fibers being disposed within said housing and secured within a respective one of said first pair of fiber securing sections, said one end of each of the first pair of optical fibers facing each other and being separated by a predetermined distance, one end of each optical fiber of said second pair of optical fibers being disposed within said housing and secured with a respective one of said second pair of fiber securing sections, said one end of each of the second pair of optical fibers also facing each other and being separated by a predetermined distance;
   a shutter movably supported with said housing between said facing ends of both the first and second pairs of optical fibers; and
   a drive mechanism supported within the housing for displacing the shutter to either block or transmit light between said first pair of optical fibers and between said second pair of optical fibers;
   said plurality of optical switches being arranged in a matrix form so that the optical light paths in one direction are aligned vertically and the optical light paths in the other direction are aligned horizontally.

5. The optical keyboard of claim 4, wherein the shutter has two light transmitting portions and two light blocking portions.

6. The optical keyboard of claim 4, wherein the axis of the facing ends of the first pair of optical fibers is approximately perpendicular to the axis of the facing ends of the second pair of optical fibers.

7. The optical keyboard of claim 4, wherein the shutter includes an H-shaped section between the facing ends of the first pair of optical fibers and an H-shaped section between the facing ends of the second pair of optical fibers.

8. The optical keyboard of claim 7, wherein each H-shaped section has a light transmitting portion and a light blocking portion disposed below the light transmitting portion.

* * * * *